US012369571B2

(12) United States Patent
Sullivan

(10) Patent No.: US 12,369,571 B2
(45) Date of Patent: Jul. 29, 2025

(54) FISHING TRAP RETRIEVAL SYSTEM WITH RELEASE MECHANISM

(71) Applicant: Joel Sullivan, Porters Lake (CA)

(72) Inventor: Joel Sullivan, Porters Lake (CA)

( * ) Notice: Subject to any disclaimer, the term of this patent is extended or adjusted under 35 U.S.C. 154(b) by 0 days.

(21) Appl. No.: 18/683,816

(22) PCT Filed: Aug. 23, 2022

(86) PCT No.: PCT/CA2022/000043
§ 371 (c)(1),
(2) Date: Feb. 15, 2024

(87) PCT Pub. No.: WO2023/028689
PCT Pub. Date: Mar. 9, 2023

(65) Prior Publication Data
US 2025/0120376 A1    Apr. 17, 2025

(30) Foreign Application Priority Data
Sep. 2, 2021   (CA) ................................ CA 3129796

(51) Int. Cl.
*A01K 69/06*   (2006.01)
(52) U.S. Cl.
CPC .................................. *A01K 69/06* (2013.01)
(58) Field of Classification Search
CPC ......... A01K 69/06; A01K 69/08; A01K 69/10
See application file for complete search history.

(56) References Cited

U.S. PATENT DOCUMENTS

| | | | |
|---|---|---|---|
| 5,987,710 A | 11/1999 | Paul et al. | |
| 6,457,896 B1 | 10/2002 | deDoes | |
| 8,028,466 B1 | 10/2011 | Schrock et al. | |
| 2005/0155271 A1* | 7/2005 | Holy | D07B 1/142 43/100 |

FOREIGN PATENT DOCUMENTS

| | | |
|---|---|---|
| CA | 3012135 A1 | 1/2020 |
| GB | 2178932 A | 2/1987 |

* cited by examiner

*Primary Examiner* — Richard G Davis
(74) *Attorney, Agent, or Firm* — Bonini IP Law, LLC; Frank J. Bonini, Jr.

(57) ABSTRACT

A fishing trap retrieval system comprising a strong rope adapted for being connected to a fishing trap at a first end thereof. A strong rope buoy is connected to a second end of the strong rope. A mid portion of the strong rope is maintained in a collapsed form. A load sensitive release mechanism is connected to the strong rope buoy and adapted for being connected to the fishing trap. A weak rope is connected to the release mechanism at a first end thereof and to a surface buoy at a second end thereof. The release mechanism is adapted for transferring a buoyancy load exerted by the strong rope buoy when submerged to the fishing trap in a first mode of operation and for releasing the strong rope buoy when the load acting thereon exceeds a predetermined load threshold in a second mode of operation.

21 Claims, 16 Drawing Sheets

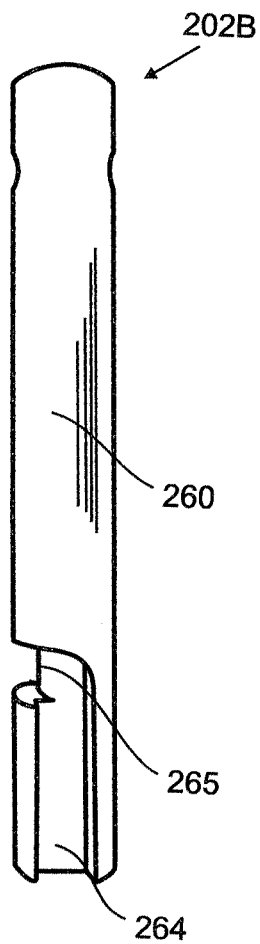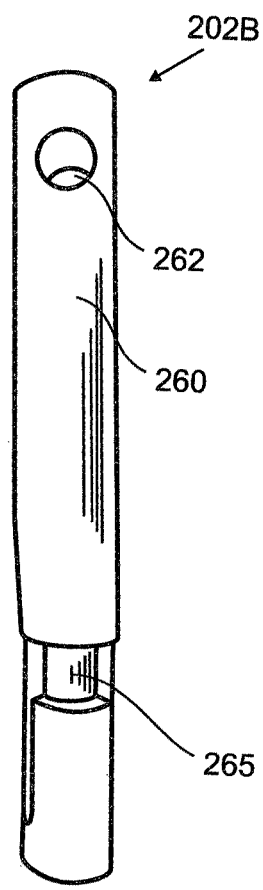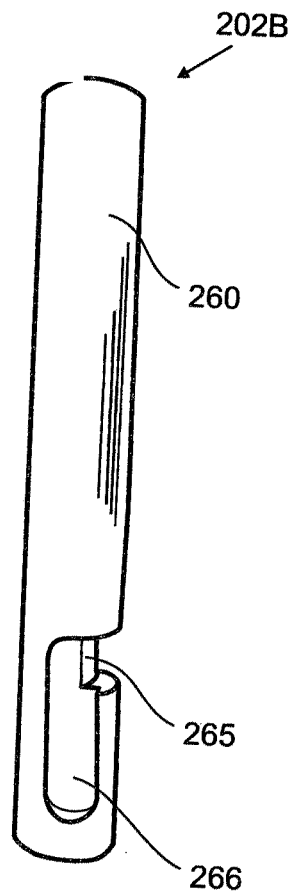
Figure 4a
Figure 4b
Figure 4c

FISHING TRAP RETRIEVAL SYSTEM WITH RELEASE MECHANISM

FIELD OF THE INVENTION

The present invention relates to the retrieval of fishing traps, and more particularly to a fishing trap retrieval system with a release mechanism.

BACKGROUND OF THE INVENTION

Typically, fishing traps for catching, for example, lobsters or crabs, are deployed on the sea floor in depths of 50 to 70 m in inshore fishing and depths below 100 m in offshore fishing. To facilitate retrieval a fishing trap or a series of fishing traps is connected via a rope to a buoy floating on the water surface to mark the location and to provide a point of attachment for pulling the fishing trap or the series of fishing traps up to the water surface and onto the deck of the fishing vessel.

Although the buoys are visible on the water surface, the ropes descending from the buoys are nearly invisible to aquatic animals such as, for example, whales, dolphins, sharks, and seals, who swim into the rope and become entangled. Specifically, endangered Northern Atlantic right whales are continuously threatened by entanglement with the ropes connecting fishing traps to respective buoys. While these large animals are capable of breaking a sufficiently weak rope having a tensile strength of 1700 lbs or less, most fishing traps having a substantial weight are connected to substantially stronger ropes to ensure pulling of the fishing traps to the water surface without breaking of the rope resulting in the loss of the fishing trap, thus making it impossible for these animals to break the strong rope resulting in severe injury or death of the animal when entangled in the strong rope of the tethered fishing trap.

Current entanglement mitigation efforts include retrieval systems using weak ropes animals can break or retrieval systems that keep the rope and buoy near the sea floor until being released to the water surface by providing a trigger signal or employing a timer.

Unfortunately, these systems are unreliable and frequently result in total loss of the fishing trap. For example, the weak ropes break when the fishing trap is pulled to the water surface, the trigger signal is not received at the device on the sea floor, or the timer is not properly set. Furthermore, the systems using a trigger signal or a timer typically require specialized deck gear, are difficult to operate, and are too expensive to be commercially viable for the average fisherman.

It is desirable to provide a fishing trap retrieval system that substantially reduces the risk of entanglement of large sea animals and that is simple and cost effective.

It is also desirable to provide a fishing trap retrieval system that substantially reduces the risk of entanglement of large sea animals and that is simple to use without substantial changes to the typical handling of the fishing traps on deck of a fishing vessel.

It is also desirable to provide a fishing trap retrieval system that substantially reduces the risk of entanglement of large sea animals and that can be implemented as a retrofit to existing fishing trap retrieval systems.

It is also desirable to provide a fishing trap retrieval system that substantially reduces the risk of entanglement of large sea animals and that substantially reduces the risk of a total loss of the fishing trap.

SUMMARY OF THE INVENTION

Accordingly, one object of the present invention is to provide a fishing trap retrieval system that substantially reduces the risk of entanglement of large sea animals and that is simple and cost effective.

Another object of the present invention is to provide a fishing trap retrieval system that substantially reduces the risk of entanglement of large sea animals and that is simple to use without substantial changes to the typical handling of the fishing traps on deck of a fishing vessel.

Another object of the present invention is to provide a fishing trap retrieval system that substantially reduces the risk of entanglement of large sea animals and that can be implemented as a retrofit to existing fishing trap retrieval systems.

Another object of the present invention is to provide a fishing trap retrieval system that substantially reduces the risk of entanglement of large sea animals and that substantially reduces the risk of a total loss of the fishing trap.

According to one aspect of the present invention, there is provided a fishing trap retrieval system. The fishing trap retrieval system comprises a strong rope adapted for being connected to a fishing trap at a first end thereof. A strong rope buoy is connected to a second end of the strong rope. A mid portion of the strong rope is maintained in a collapsed form. A load sensitive release mechanism is connected to the strong rope buoy and adapted for being connected to the fishing trap. A weak rope is connected to the release mechanism at a first end thereof and to a surface buoy at a second end thereof. The release mechanism is adapted for transferring a buoyancy load exerted by the submerged strong rope buoy to the fishing trap in a first mode of operation and for releasing the strong rope buoy when the load acting thereon exceeds a predetermined load threshold in a second mode of operation.

According to the aspect of the present invention, there is provided a fishing trap retrieval system. The fishing trap retrieval system comprises a strong rope adapted for being connected to a fishing trap at a first end thereof. A strong rope buoy is connected to a second end of the strong rope. A mid portion of the strong rope is maintained in a collapsed form. A load sensitive release mechanism is connected to the strong rope buoy and adapted for being connected to the fishing trap. A weak rope is connected to the release mechanism at a first end thereof and to a surface buoy at a second end thereof. The release mechanism is adapted for transferring a buoyancy load exerted by the submerged strong rope buoy to the fishing trap in a first mode of operation and for releasing the strong rope buoy when the load acting thereon exceeds a predetermined load threshold in a second mode of operation. The predetermined load threshold for releasing the strong rope buoy is less than a tensile strength of the weak rope. The release mechanism comprises a release device and a locking key and the release device securely holds the locking key in the first mode of operation and releases the locking key in the second mode of operation.

The release device comprises a locking element adapted for interacting with the locking key in the first mode of operation with the locking element being movable between a first position for interacting with the locking key and a second position for releasing the locking key. The release device is spring loaded such that the locking element is maintained in the first position until the predetermined load threshold is reached.

According to the aspect of the present invention, there is provided a fishing trap retrieval system. The fishing trap retrieval system comprises a strong rope adapted for being connected to a fishing trap at a first end thereof. A strong rope buoy is connected to a second end of the strong rope. A mid portion of the strong rope is maintained in a collapsed form. A load sensitive release mechanism is connected to the strong rope buoy and adapted for being connected to the fishing trap. A weak rope is connected to the release mechanism at a first end thereof and to a surface buoy at a second end thereof. The release mechanism is adapted for transferring a buoyancy load exerted by the submerged strong rope buoy to the fishing trap in a first mode of operation and for releasing the strong rope buoy when the load acting thereon exceeds a predetermined load threshold in a second mode of operation. The predetermined load threshold for releasing the strong rope buoy is less than a tensile strength of the weak rope. The release mechanism comprises a release device and a locking key and the release device securely holds the locking key in the first mode of operation and releases the locking key in the second mode of operation. The release device comprises a locking element adapted for interacting with the locking key in the first mode of operation with the locking element being movable between a first position for interacting with the locking key and a second position for releasing the locking key. The release device is spring loaded such that the locking element is maintained in the first position until the predetermined load threshold is reached. The release device comprises a housing and a locking pin longitudinal movable mounted to the housing. The locking pin has the locking element at a first end thereof. An abutting element is mounted to a second end of the locking pin with the abutting element being longitudinal movable within the housing and a helical compression spring is disposed between the housing and the abutting element with the compression spring surrounding a portion of the locking pin.

According to the aspect of the present invention, there is provided a fishing trap retrieval system. The fishing trap retrieval system comprises a strong rope adapted for being connected to a fishing trap at a first end thereof. A strong rope buoy is connected to a second end of the strong rope. A mid portion of the strong rope is maintained in a collapsed form. A load sensitive release mechanism is connected to the strong rope buoy and adapted for being connected to the fishing trap. A weak rope is connected to the release mechanism at a first end thereof and to a surface buoy at a second end thereof. The release mechanism is adapted for transferring a buoyancy load exerted by the submerged strong rope buoy to the fishing trap in a first mode of operation and for releasing the strong rope buoy when the load acting thereon exceeds a predetermined load threshold in a second mode of operation. The predetermined load threshold for releasing the strong rope buoy is less than a tensile strength of the weak rope. The release mechanism comprises a release device and a locking key and wherein the release device securely holds the locking key in the first mode of operation and releases the locking key in the second mode of operation. The release device comprises a locking element adapted for interacting with the locking key in the first mode of operation with the locking element being movable between a first position for interacting with the locking key and a second position for releasing the locking key. The release device is spring loaded such that the locking element is maintained in the first position until the predetermined load threshold is reached. The locking key comprises an insertion section and a holding section with the insertion section being adapted to enable insertion of the locking element while the same is in the first position and the holding section being adapted to securely hold the locking key in the first mode of operation.

According to the aspect of the present invention, there is provided a fishing trap retrieval system. The fishing trap retrieval system comprises a strong rope adapted for being connected to a fishing trap at a first end thereof. A strong rope buoy is connected to a second end of the strong rope. A mid portion of the strong rope is maintained in a collapsed form. A load sensitive release mechanism is connected to the strong rope buoy and adapted for being connected to the fishing trap. A weak rope is connected to the release mechanism at a first end thereof and to a surface buoy at a second end thereof. The release mechanism is adapted for transferring a buoyancy load exerted by the submerged strong rope buoy to the fishing trap in a first mode of operation and for releasing the strong rope buoy when the load acting thereon exceeds a predetermined load threshold in a second mode of operation. The predetermined load threshold for releasing the strong rope buoy is less than a tensile strength of the weak rope. The release mechanism comprises a release device and a locking key and wherein the release device securely holds the locking key in the first mode of operation and releases the locking key in the second mode of operation. The release device comprises a locking element adapted for interacting with the locking key in the first mode of operation with the locking element being movable between a first position for interacting with the locking key and a second position for releasing the locking key. The release device is spring loaded such that the locking element is maintained in the first position until the predetermined load threshold is reached. The release device is connected to the strong rope buoy and the locking key is for being connected to the fishing trap. The mid portion of the strong rope is maintained in a collapsed form using a containing structure adapted for containing the mid portion of the strong rope in the collapsed form therein and for releasing the mid portion of the strong rope when the strong rope buoy is released.

According to the aspect of the present invention, there is provided a fishing trap retrieval system. The fishing trap retrieval system comprises a strong rope adapted for being connected to a fishing trap at a first end thereof. A strong rope buoy is connected to a second end of the strong rope. A mid portion of the strong rope is maintained in a collapsed form. A load sensitive release mechanism is connected to the strong rope buoy and adapted for being connected to the fishing trap. A weak rope is connected to the release mechanism at a first end thereof and to a surface buoy at a second end thereof. The release mechanism is adapted for transferring a buoyancy load exerted by the submerged strong rope buoy to the fishing trap in a first mode of operation and for releasing the strong rope buoy when the load acting thereon exceeds a predetermined load threshold in a second mode of operation. The predetermined load threshold for releasing the strong rope buoy is less than a tensile strength of the weak rope. The release mechanism comprises a release device and a locking key and wherein the release device securely holds the locking key in the first mode of operation and releases the locking key in the second mode of operation. The release device comprises a locking element adapted for interacting with the locking key in the first mode of operation with the locking element being movable between a first position for interacting with the locking key and a second position for releasing the locking key. The release device is spring loaded such that the locking element is maintained in the first position until the predetermined load threshold is reached. The release device is connected to the strong rope buoy and the locking key is connected to the release device via a locking key rope. The mid portion of the strong rope is maintained in a collapsed form by coiling the mid portion of the strong rope into a strong rope coil. The locking key rope forms a locking key rope loop around a section of the strong rope coil. A connecting rope is connected to the locking key rope loop and adapted for being connected to the fishing trap. A first section of a ring element is contained in the locking key rope loop and a second opposite section thereof is connected to the connecting rope.

According to the aspect of the present invention, there is provided a fishing trap retrieval system retrofit for retrofitting a fishing trap connected via a strong rope to a strong rope buoy. The retrofit comprises a load sensitive release mechanism adapted for being connected to the strong rope buoy, the fishing trap, and to a surface buoy via a weak rope. The release mechanism is adapted for transferring a buoyancy load exerted by the submerged strong rope buoy to the fishing trap in a first mode of operation and for releasing the strong rope buoy when the load acting thereon exceeds a predetermined load threshold in a second mode of operation with the predetermined load threshold being less than a tensile strength of the weak rope.

The advantage of the present invention is that it provides a fishing trap retrieval system that substantially reduces the risk of entanglement of large sea animals and that is simple and cost effective.

A further advantage of the present invention is that it provides a fishing trap retrieval system that substantially reduces the risk of entanglement of large sea animals and that is simple to use without substantial changes to the typical handling of the fishing traps on deck of a fishing vessel.

A further advantage of the present invention is that it provides a fishing trap retrieval system that substantially reduces the risk of entanglement of large sea animals and that can be implemented as a retrofit to existing fishing trap retrieval systems.

A further advantage of the present invention is that it provides a fishing trap retrieval system that substantially reduces the risk of entanglement of large sea animals and that substantially reduces the risk of a total loss of the fishing trap.

BRIEF DESCRIPTION OF THE DRAWINGS

A preferred embodiment of the present invention is described below with reference to the accompanying drawings, in which:

FIGS. 4a to 4c are simplified block diagrams illustrating in side views a different implementation of the locking key of the fishing trap release system according to the preferred embodiment of the invention;

DESCRIPTION OF THE PREFERRED EMBODIMENT

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

Figure 1A:
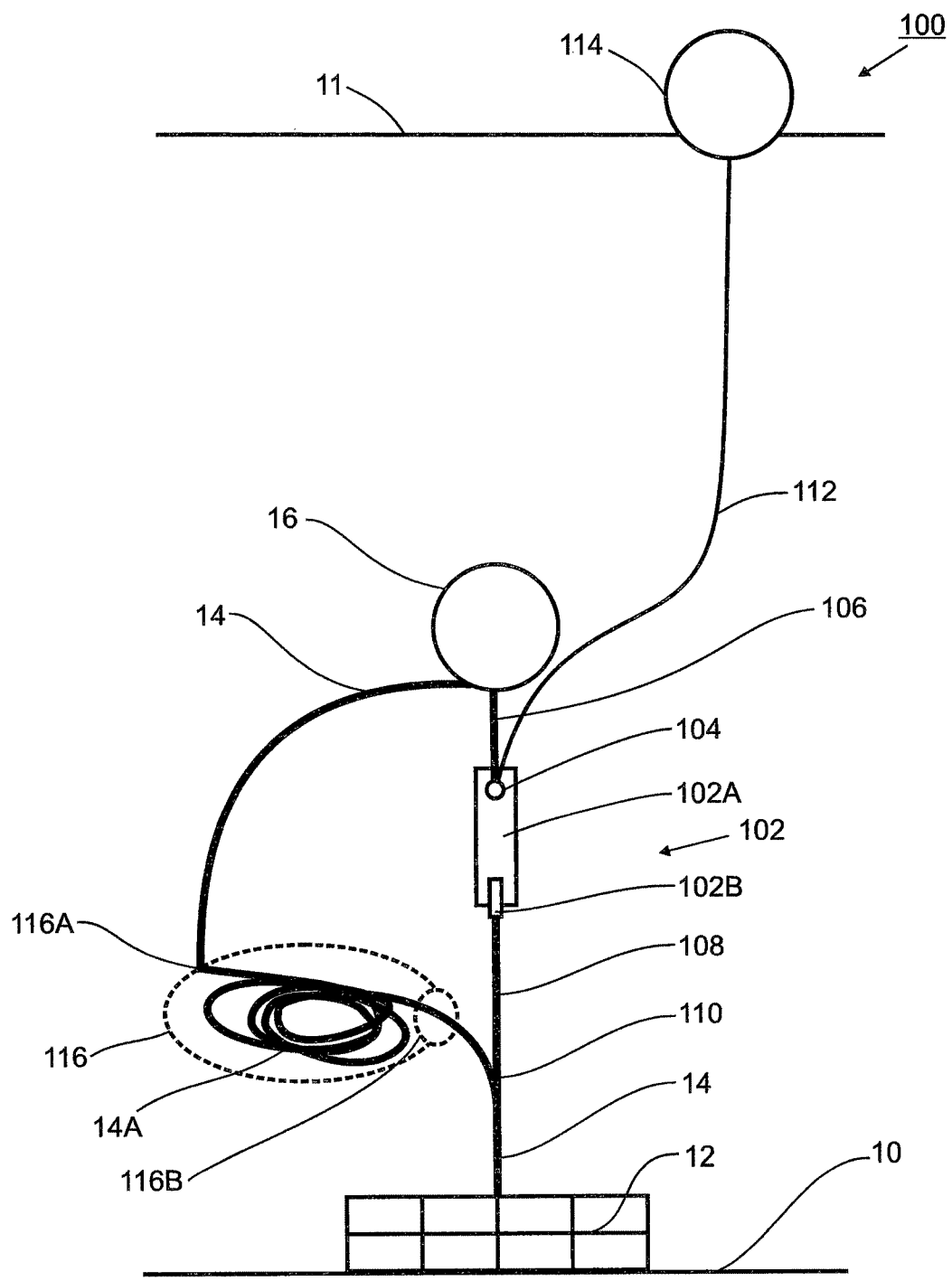
FIGS. 1a to 1c are simplified block diagrams illustrating in side views a fishing trap release system in different modes of operation according to a preferred embodiment of the invention.

Referring to FIGS. 1a to 1i, 2a to 2c, 3a to 3d, 5a to 5e, and 6a to 6c a fishing trap retrieval system 100 according to a preferred embodiment of the invention is provided. FIG. 1a illustrates the fishing trap retrieval system 100 in a deployed stage. Strong rope 14 is connected to fishing trap 12 disposed on sea floor 10 at a first end thereof and strong rope buoy 16 is connected to a second end of the strong rope 14. A mid portion 14A of the strong rope 14 is maintained in a collapsed form, as will be described in more detail hereinbelow. Load sensitive release mechanism 102 is connected to the strong rope buoy 16 and directly, or indirectly via the first end of the strong rope 14, to the fishing trap 12 such that a buoyancy load exerted by the submerged strong rope buoy 16 is transferred through the release mechanism 102 by-passing the collapsed mid portion 14A of the strong rope 14. Surface buoy 114 floating on the water surface 11 is connected to the release mechanism 102 via weak rope 112. Optionally, a strong rope having weak sections may also be employed such as, for example, a conventional strong rope having weak breakable plastic links spliced in every 40 ft.

The release mechanism 102 transfers the buoyancy load exerted by the submerged strong rope buoy 16 to the fishing trap 12 in a first mode of operation and releases the strong rope buoy 16 when the load acting thereon exceeds a predetermined load threshold in a second mode of operation with the predetermined load threshold for releasing the strong rope buoy 16 being less than a tensile strength of the weak rope 112. For example, in order to protect Northern Atlantic right whales the weak rope 112 is chosen to have a tensile strength of 1700 lbs, thus enabling these large animals to break the weak rope 112 when entangled therein. The load threshold may then be chosen in the range between 500 lbs and 1000 lbs for enabling reliable release of the strong rope buoy 16 in case of entanglement of a whale in the weak rope 112 while also enabling retrieval of the fishing trap 12 with the release mechanism 102 remaining in the first mode of operation, thus facilitating handling of the retrieved fishing trap 12 and the fishing trap retrieval system 100 connected thereto on deck of the fishing vessel.

Preferably, the release mechanism 102 comprises a release device 102A and a locking key 102B. The release device 102A securely holds the locking key 102B in the first mode of operation and releases the locking key 102B in the second mode of operation. For example, the release device 102A is connected at end portion 104 to the strong rope buoy 16 via connecting rope 106, while the locking key 102B is connected via connecting rope 108 to the strong rope 14 at 110 in a conventional manner, for example, spliced thereto, or alternatively directly connected to the fishing trap 12.

The mid portion 14A of the strong rope 14 is, for example, contained in a collapsed form in containing structure 116 forming a bag with opening 116B. The containing structure 116 is made of, for example, a fishing net material forming a bag with opening 116B. There are numerous ways of securing the opening 116B such that the mid portion 14A of the strong rope 14 remains contained therein while also enabling release of the same when the strong rope buoy 16 is released. End 116A of the containing structure 116 is connected to the strong rope 14 in proximity to the strong rope buoy 16 with the opening 116B facing away from the strong rope buoy 16, as illustrated in FIG. 1a.

Figure 1B:
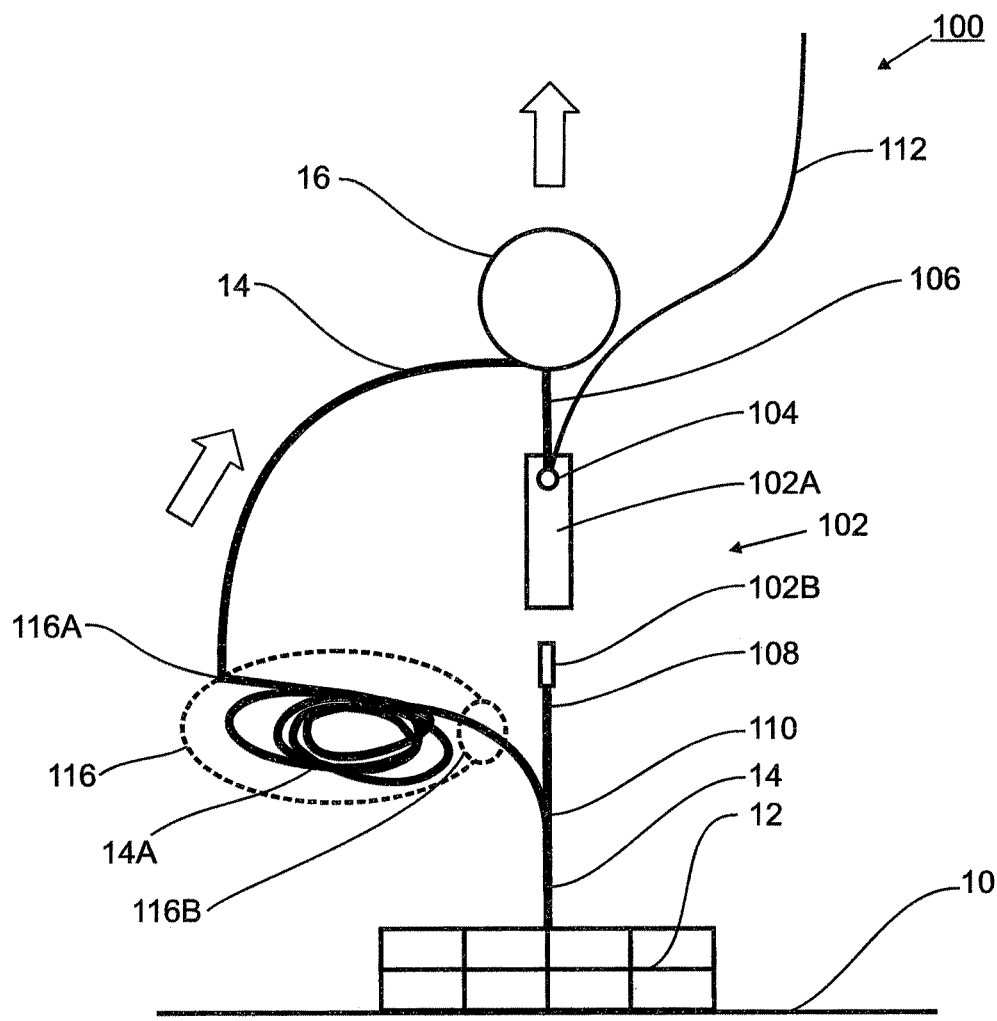
Figure 1C:
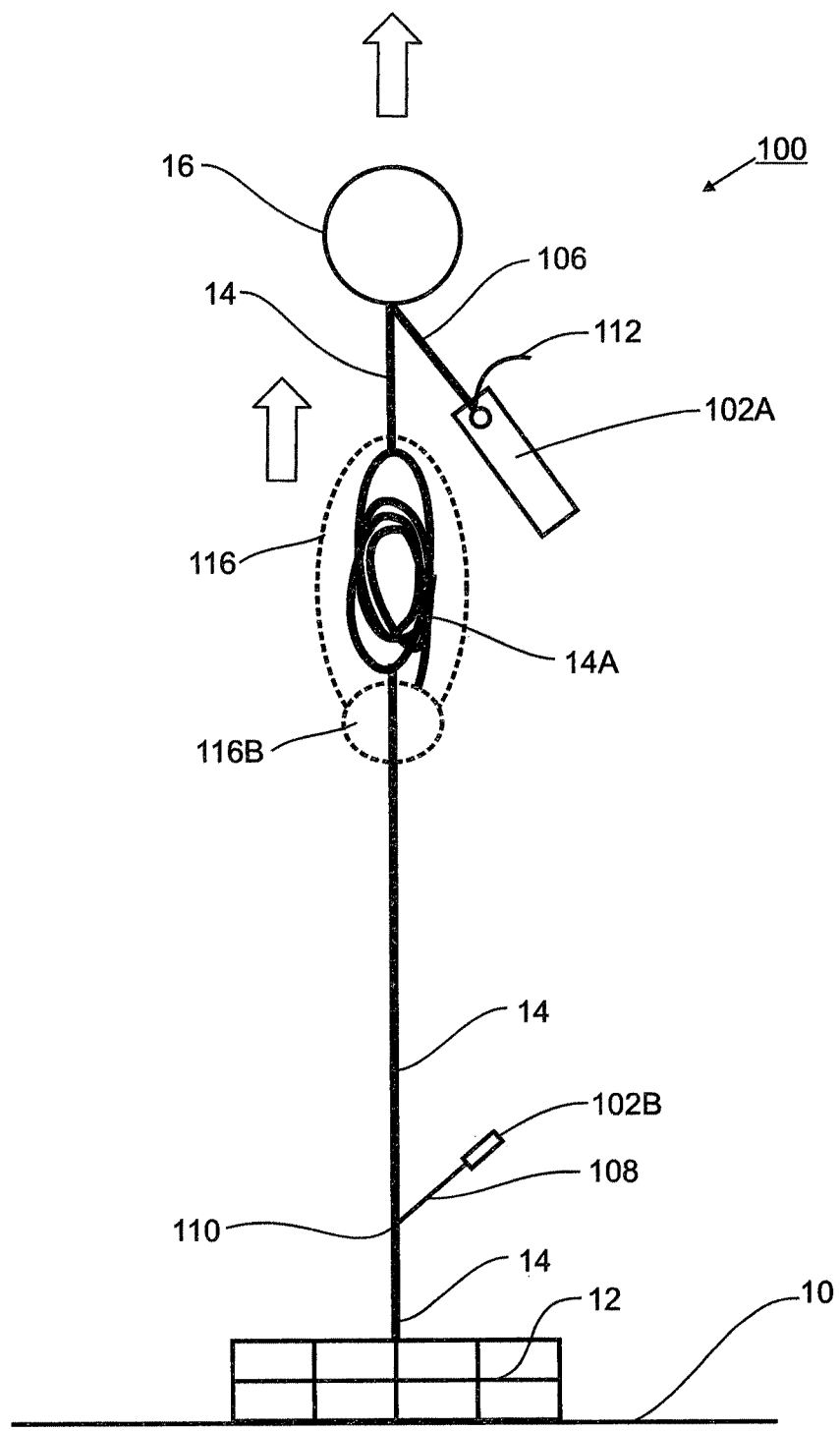
Figure 1D:
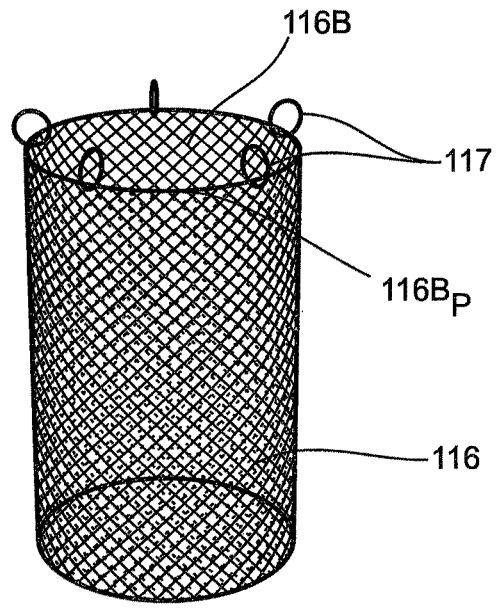
FIGS. 1d and 1e are simplified block diagrams illustrating in perspective side views a mechanism for securing a mid portion of a strong rope of the fishing trap release system according to the preferred embodiment of the invention.
Figure 1E:
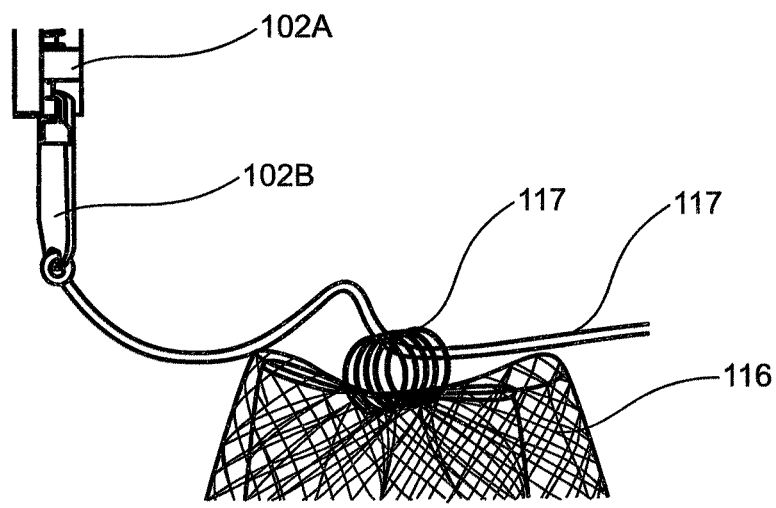
Figure 1F:
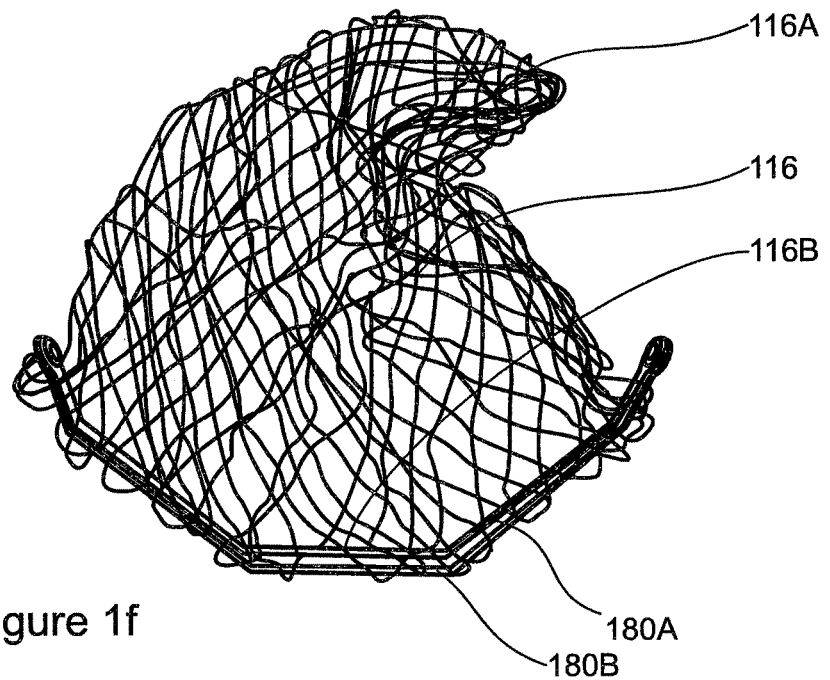
FIGS. 1f and 1g are simplified block diagrams illustrating in perspective views a clamshell-type containing structure in a closed and open position, respectively, of the fishing trap release system according to the preferred embodiment of the invention.
Figure 1G:
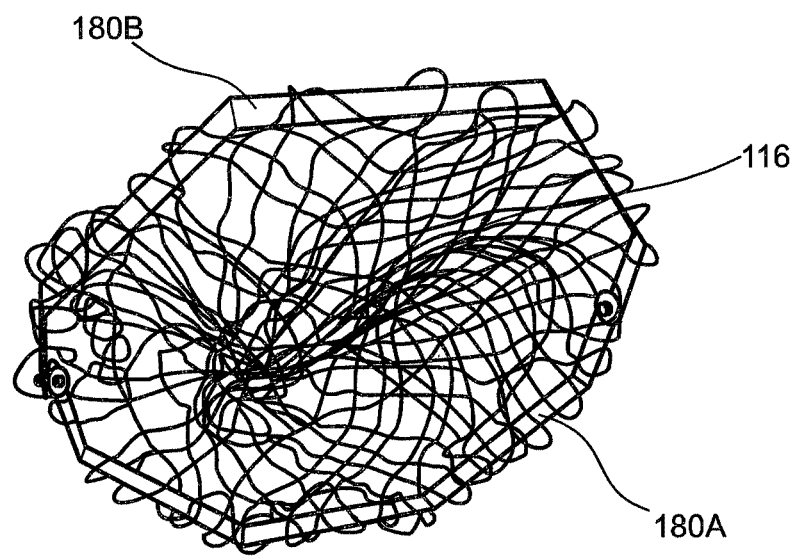

Preferably, the opening 116B is secured by disposing rings 117 around the perimeter 116B$_p$ of the opening 116B, for example, 5 rings 117 made of ABS plastic material and having a diameter of approximately 4" disposed in an equidistant manner, as illustrated in FIG. 1d. For securing the opening 116B in the first mode of operation, the locking key 102B, in concert with connecting rope 108, is passed through each of the rings 117 and secured to the release device 102A, as illustrated in FIG. 1e. Once the locking key 102B is released from the release device 102A in the second mode of operation, the same is pulled through the rings 117, thus enabling opening of the containing structure 116 and release of the mid portion 14A of the strong rope 14. Alternatively, a tie surrounding the opening 116B may be employed.

Referring to FIGS. 1f to 1i an alternative preferred implementation for containing the collapsed mid portion 14A of the strong rope 14 in the containing structure 116 in the first mode of operation and for reliably releasing the mid portion 14A of the strong rope 14 in the second mode of operation of the fishing trap retrieval system 100 is provided. Here, the containing structure 116 is provided in a clamshell-type manner comprising bag 116, made of, for example, a fishing net material, with opening 116B. The perimeter of the opening 116B is surrounded by two semi-rigid jaws 180A and 180B. The jaws 180A and 180B are connected to the bag 116, for example, by using standard fasteners used in fisheries called 'hog rings' accommodated in holes disposed in the jaws 180A and 180B. Alternatively, Zip Tie fasteners may be employed instead of the 'hog rings' or, further alternatively, each of the jaws 180A and 180B may be woven through the respective mesh structure of the bag 116 in proximity to the opening 116B.

Figure 1H:
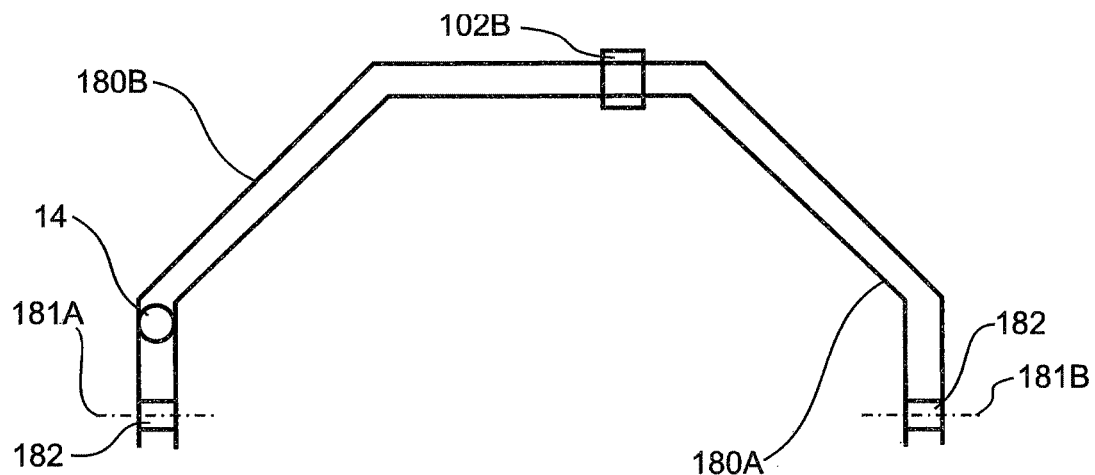
FIGS. 1h and 1i are simplified block diagrams illustrating in side views jaws of the clamshell-type containing structure in a closed and open position, respectively, of the fishing trap release system according to the preferred embodiment of the invention.

Preferably, the jaws 180A and 180B overlap with a small gap therebetween when in the closed position to contain the collapsed mid portion 14A of the strong rope 14 in the bag 116, as illustrated in FIG. 1h. The small gap is determined to enable accommodation of the strong rope 14 between the jaws 180A and 180B when in the closed position. The jaws 180A and 180B are mounted to each other at both end portions thereof such that they are pivotally movable with respect to each other about axes 181A and 181B. Spacing elements 182 are interposed between the respective end portions of the jaws 180A and 180B. The end portions of the jaws 180A and 180B are pivotally movable mounted together in a conventional manner using, for example, screw bolts and screw nuts with the screw bolts being accommodated in respective bores disposed in the end portions of the jaws 180A and 180B and the spacing elements 182.

The jaws 180A and 180B are secured in the closed position via locking key 102B adapted for mechanically restraining the overlapping jaws 180A and 180B in the closed position as will be described hereinbelow with reference to FIGS. 5a to 5e. After engagement of the locking key 102B with the release device 102A the jaws 180A and 180B are prevented from opening.

Figure 1I:
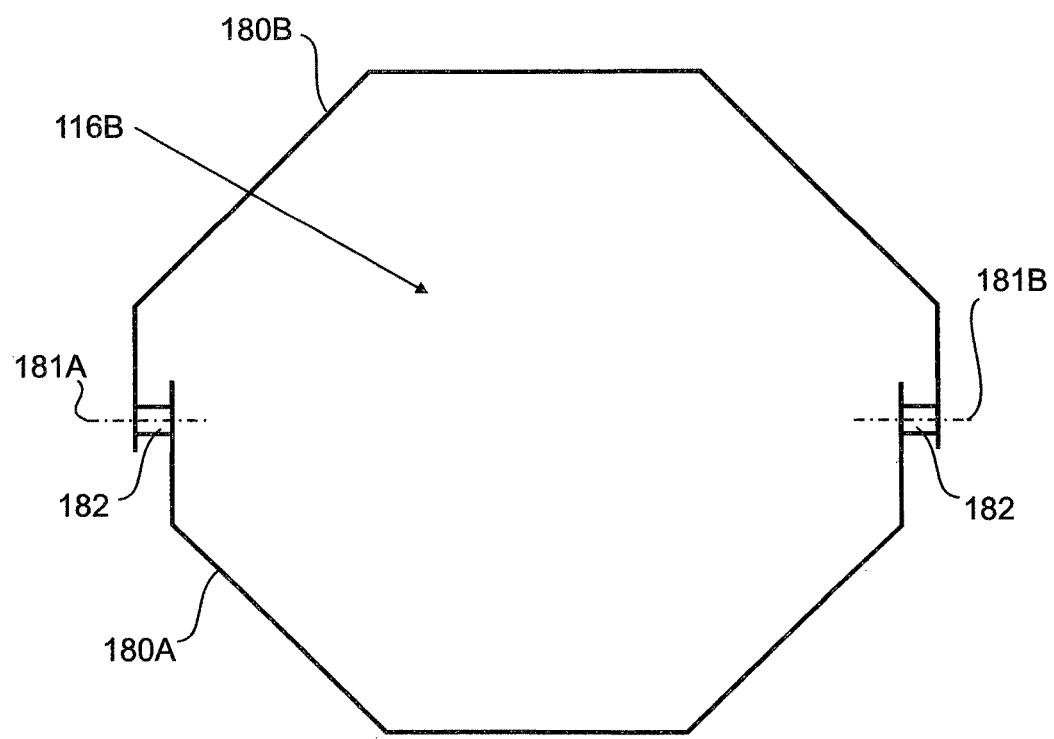

When the load acting on the release mechanism 102 exceeds the predetermined load threshold in a second mode of operation, the locking key 102B disengages from the release device 102A followed by disengagement of the locking key 102B from the jaws 180A and 180B, thus enabling the collapsed mid portion 14A of the strong rope 14 in the bag 116 to push open the jaws 180A and 180B when the bag 116, having end 116A connected to the strong rope 14, is pulled away. In the open position the jaws 180A and 180B surround opening 116B, as illustrated in FIG. 1i, through which the collapsed mid portion 14A of the strong rope 14 is released.

Preferably, the jaws 180A and 180B are semi-rigid having sufficient rigidity to firmly form the perimeter of the opening 116B, yet have also sufficient flexibility to enable bending for accommodating the rope 14 therebetween and for being pushed together when mechanically restrained by the locking key 102B. For example, the jaws 180A and 180B are made as thin strips of a polycarbonate material in a conventional manner with polycarbonate material being known in the art as strong, resilient, and bendable. As illustrated in FIGS. 1f to 1i, each jaw 180A, 180B comprises a plurality of straight sections arranged to form an arc corresponding to approximately a half of the perimeter of the opening 116B. As is evident to one skilled in the art, the jaws 180A, 180B may be provided having different shapes such as, for example, semi-circles, or semi-ovals, depending on design preferences.

Alternatively, the end 116A of the containing structure 116 is connected to the strong rope 14 in proximity to the fishing trap 12 with the opening 116B facing away from the fishing trap 12. As is evident to one skilled in the art, there are numerous other ways of providing the containing structure 116 such as, for example, a cage or a disused fishing trap with the release mechanism 102 being adapted for holding a cage door closed in the first mode of operation and for releasing the cage door in the second mode of operation by connecting the release device 102A to the cage and the locking key 102B to the cage door.

When the load acting on the release device 102A exceeds the predetermined load threshold the locking key 102B is released allowing the strong rope buoy 16 to move upwards towards the water surface 11, as indicated by the block arrows in FIGS. 1b and 1c. With the strong rope buoy 16 moving upwards the mid portion 14A of the strong rope 14 is unfolded and released through the opening 116B, as illustrated in FIG. 1c.

Figure 2A:
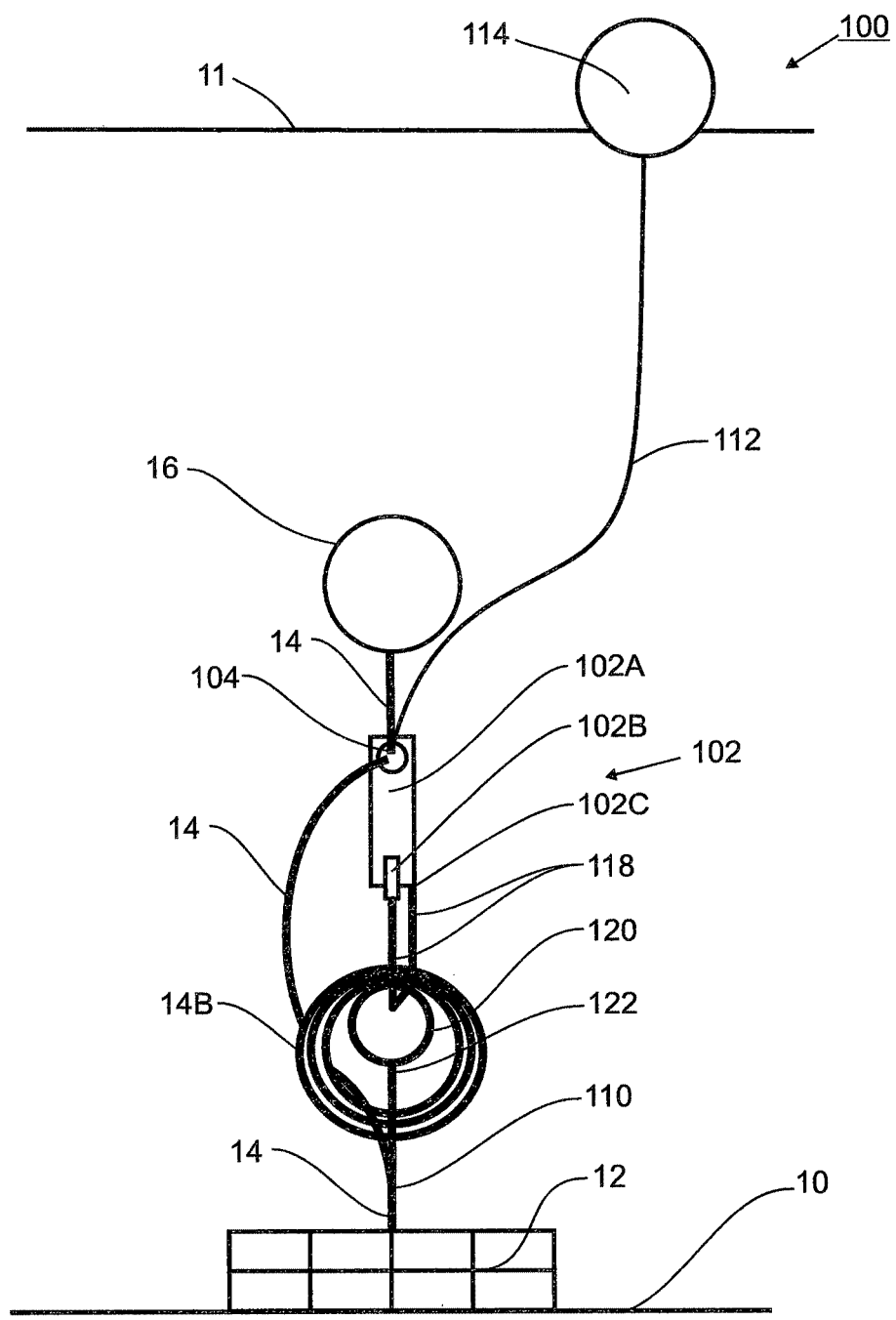
FIGS. 2a to 2c are simplified block diagrams illustrating in side views a different implementation of the fishing trap release system in different modes of operation according to the preferred embodiment of the invention.

In an alternative implementation the mid portion 14B of the strong rope 14 is maintained in a collapsed form by coiling the same into strong rope coil 14B, as illustrated in FIG. 2a. Here, the release device 102A is connected to the strong rope buoy 16 at the end 104 via the strong rope 14, while the locking key 102B is connected to the release device 102A at end 102C via locking key rope 118. The locking key rope 118 forms a locking key rope loop around a section of the strong rope coil 14B and contains a first section of ring element 120 therein. Connecting rope 122 is connected at a first end thereof to the strong rope 14 at 110 in a conventional manner, for example, spliced thereto, or alternatively directly connected to the fishing trap 12. A second end of the connecting rope 122 forms a loop around a second opposite section of the ring element 120. Here, the buoyancy load exerted by the strong rope buoy 16 when submerged is transferred via the release device 102A, the locking key 102B, the locking key rope loop 118, the ring element 120, and the connecting rope 122 to the fishing trap 12, thus by-passing the strong rope coil 14B.

Figure 2B:
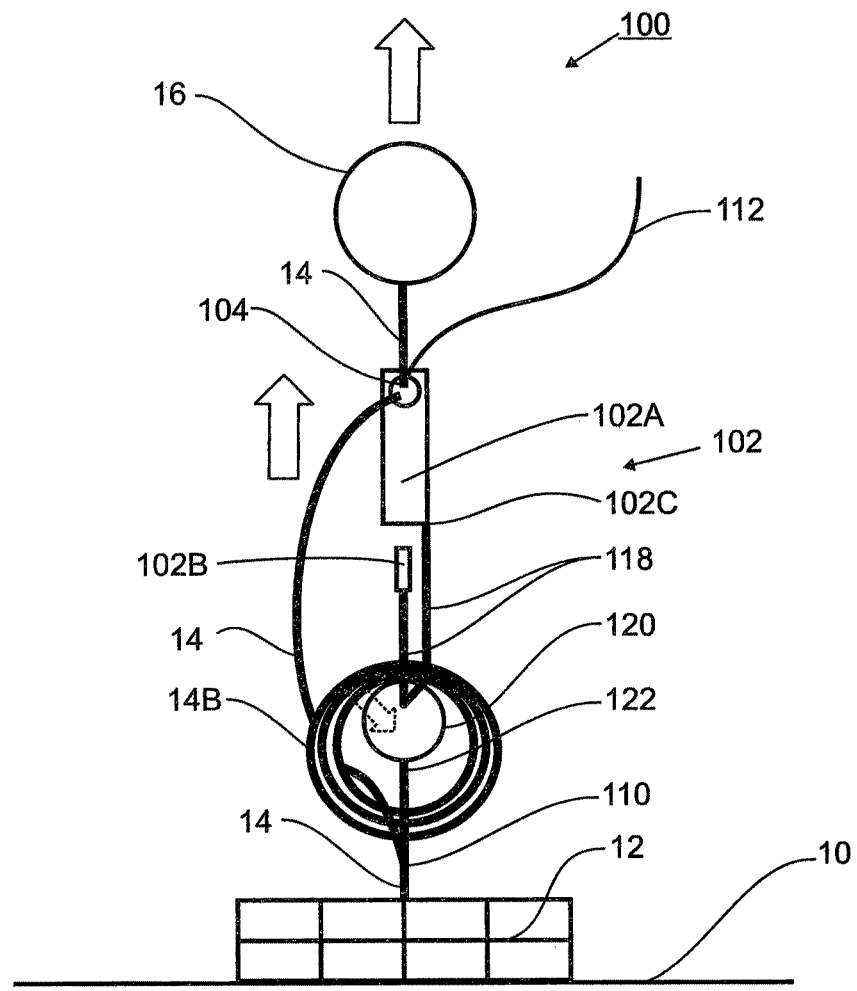
Figure 2C:
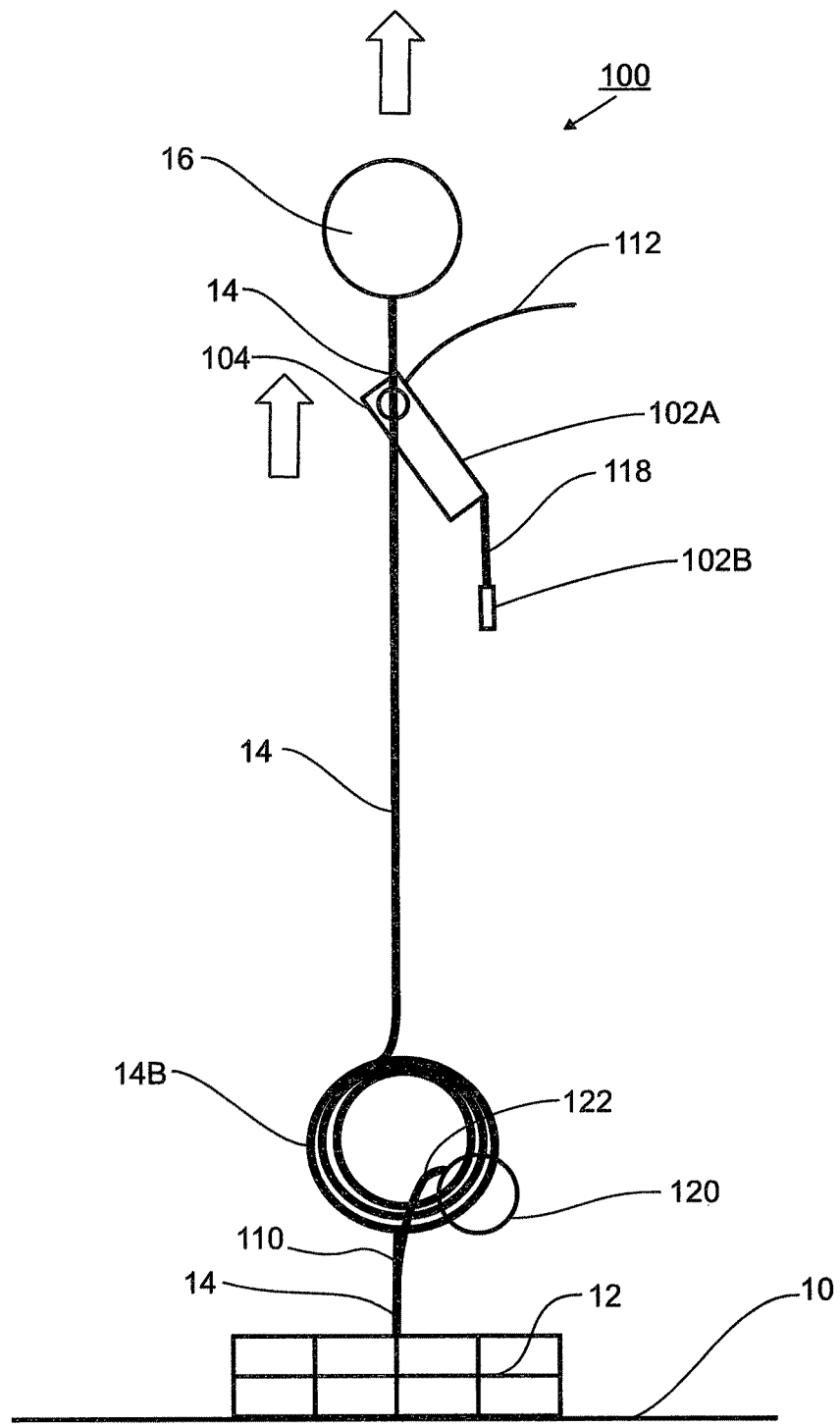

When the load acting on the release device 102A exceeds the predetermined load threshold the locking key 102B is released allowing the strong rope buoy 16 to move upwards towards the water surface 11, as indicated by the block arrows in FIGS. 2b and 2c. With the strong rope buoy 16 moving upwards the locking key 102B is pulled through the ring element 120, as indicated by the dashed block arrow in FIG. 2b, thus enabling uncoiling of the mid portion 14B of the strong rope 14, as illustrated in FIG. 2c. The diameter of the ring element 120 is chosen to be sufficiently large to ensure that the locking key 102B is reliably pulled therethrough without getting caught. The ring element 120 is made of, for example, a sufficiently strong plastic material such as Acetal plastic or stainless steel.

It is noted that, while in the FIGS. 1a to 1c and 2a to 2c the collapsed mid portion of the strong rope 14 is placed in close proximity to the fishing trap 12, it is also possible to place the collapsed mid portion of the strong rope 14 at a location closer to the water surface 11, thus reducing the length of the weak rope 112.

Figures 3A, 3B:
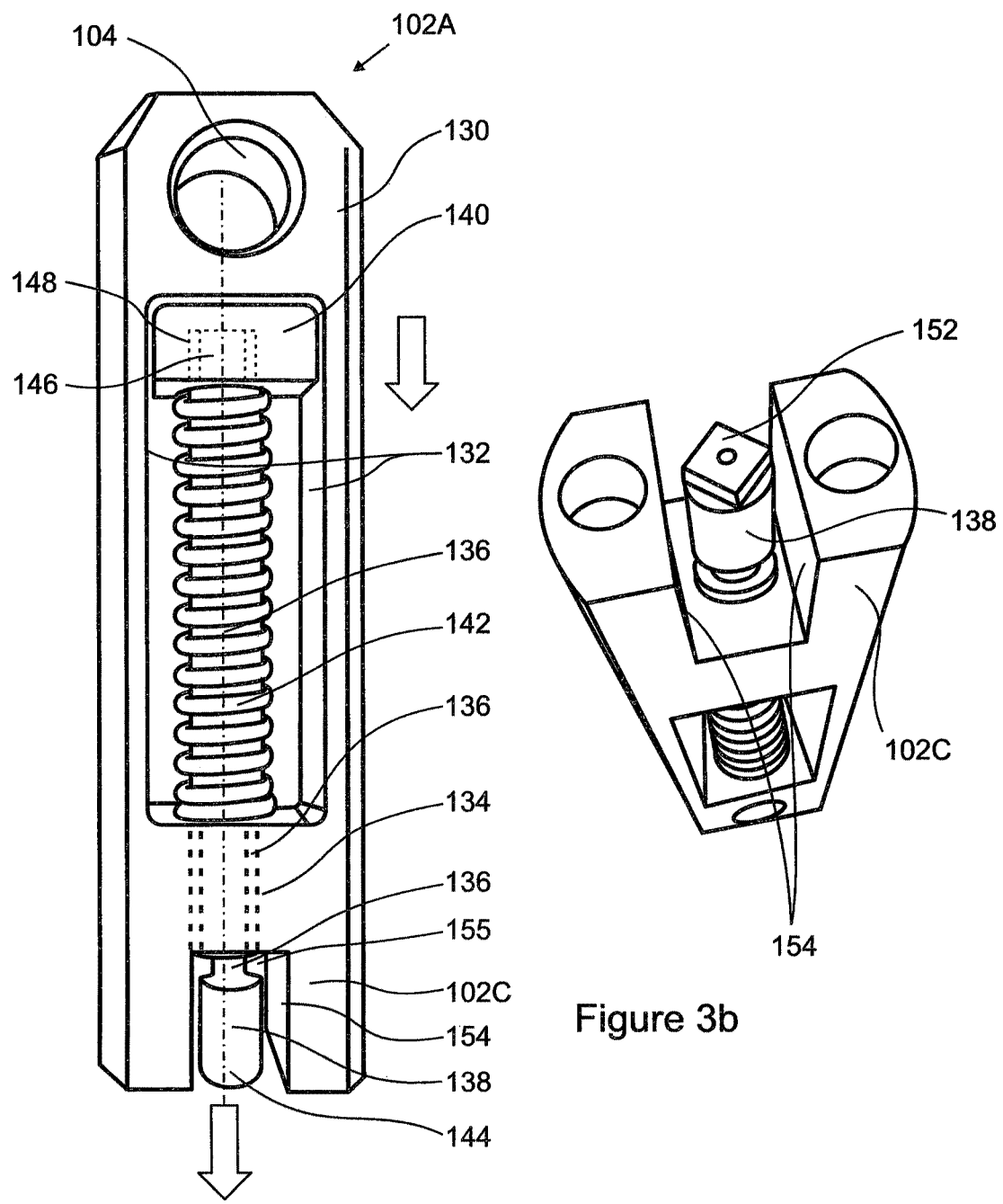
FIGS. 3a and 3b are simplified block diagrams illustrating in a side view and a top perspective view a locking device of the fishing trap release system according to the preferred embodiment of the invention.
Figures 3C, 3D:
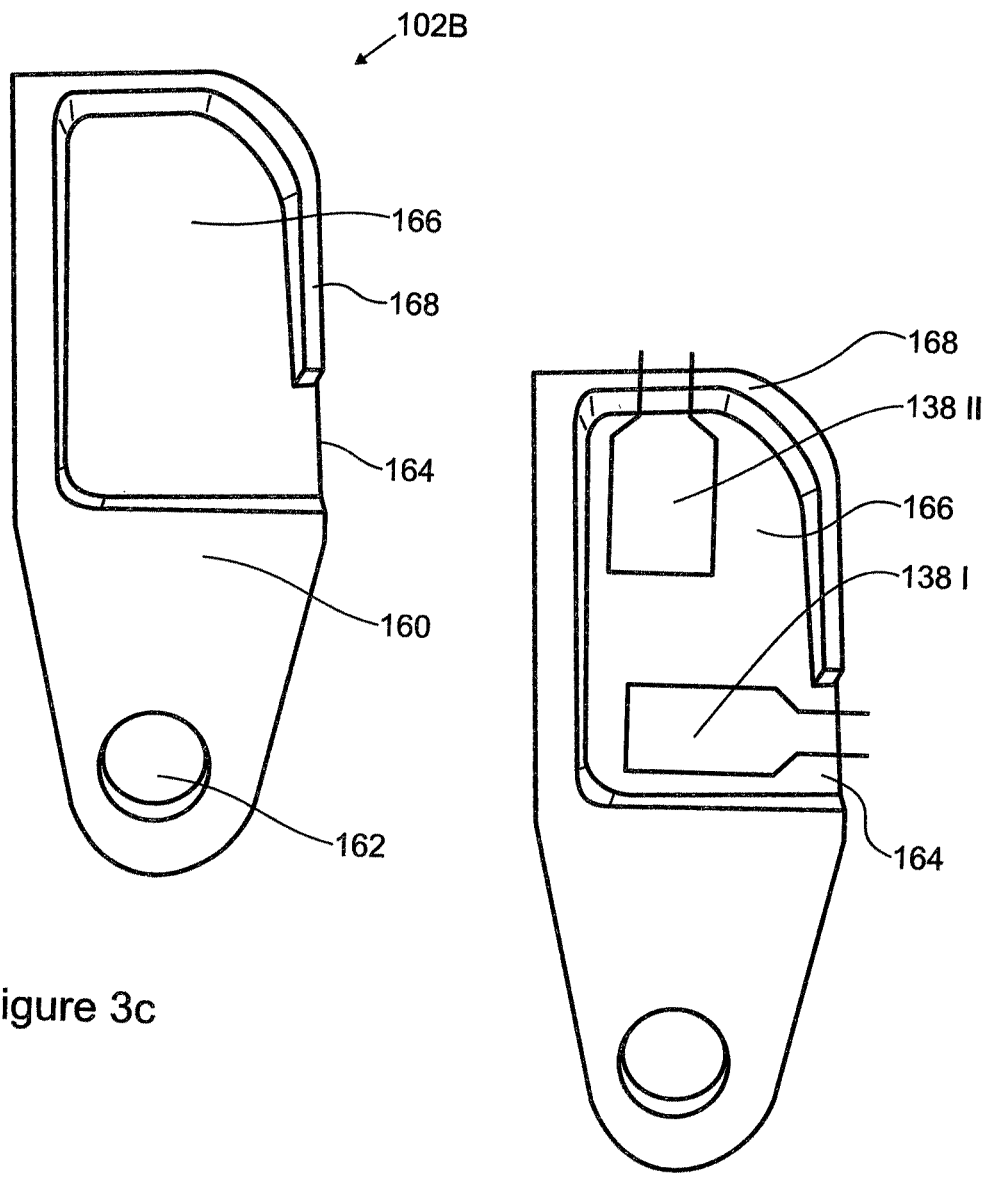
FIGS. 3c and 3d are simplified block diagrams illustrating in side views a locking key of the fishing trap release system according to the preferred embodiment of the invention.

Referring to FIGS. 3a to 3d a preferred release mechanism 102 of the fishing trap retrieval system 100 is provided. The release device 102A comprises housing 130 having bore 134 for accommodating locking pin 136 therein. The locking pin 136 comprises locking element 138 at a first end thereof and abutting element 140 at a second end thereof. Preferably, the abutting element 140 comprises a threaded bore 148 mated with a threaded end portion 146 of the locking pin 136. The locking pin 136 is longitudinally movable along axis 144 and guided in the bore 134, while the abutting element 140 is guided along guiding surfaces 132 of the housing 130. The locking element 138 interacts with the locking key 102B in a first position, securely holding rim 168 and holding section 166 of the locking key 102B between an interacting surface thereof and a locking portion of the housing 130, locking space 155 and locking surface 154, respectively, as illustrated in FIGS. 3a to 3c. The release device 102A is spring loaded such that the locking element 138 is maintained in the first position until the predetermined load threshold is reached. When the predetermined threshold is reached the locking pin 136 together with the locking element 138 are longitudinally moved downward to a second position, as indicated by the block arrow in FIG. 3a, thus releasing the locking key 102B.

Preferably, the release device 102A is spring loaded using helical compression spring 142 disposed between the housing 130 and the abutting element 140 with the compression spring 142 surrounding a portion of the locking pin 136.

The predetermined load threshold is easily changed by exchanging the compression spring in a simple manner. For example, the locking pin 136 is disengaged from the abutting element 140 by turning the same via engaging element 152. After removal of the locking pin 136 through bore 134, the compression spring 142 can be removed and replaced. The locking device 102A is then reassembled in similar fashion in reverse order.

The locking key 102B comprises, for example, a substantially flat locking key body 160 having bore 162 disposed at a first end thereof for enabling connecting the same to the ropes 108 or 118. The locking key body 160 further comprises holding section 166 surrounded by rim 168 placed opposite the bore 162. Insertion section 164 enables insertion of the locking key 102B while the locking element 138 of the locking device 102A is in the first position. As illustrated in FIG. 3d, the locking key 102B is mated with the locking device 102A by inserting the same such that the locking element 138 is inserted into the insertion section 164, indicated as 138I, followed by pulling and turning the locking key 102B until the holding section is secured to the locking element 138, indicated as 138 II.

As is evident to one skilled in the art, there are numerous other ways of providing the locking key 102B with an insertion section such as, for example, locking key 202B illustrated in FIGS. 4a to 4c. Here, the locking key 202B has a pin shaped locking key body 260 with insertion section 264, transitional section 265, and holding section 266 placed opposite bore 262 for enabling connecting the same to the ropes 108 or 118. The locking key 202B is mated with a respective locking element of the locking device by inserting the locking element into the insertion section 264 until the same is level with the transitional section 265. The locking key 202B is then turned until the holding section 266 is reached and then pulled until the holding section is secured to the locking element.

In an example implementation, the housing 130 is made of Acetal plastic material in a conventional manner, while the locking pin 136 and the locking key 102A are made of 316 stainless steel in a conventional manner, and the compression spring 142 is a commercially available helical compression spring made of 17-7 stainless steel.

Figure 5A:
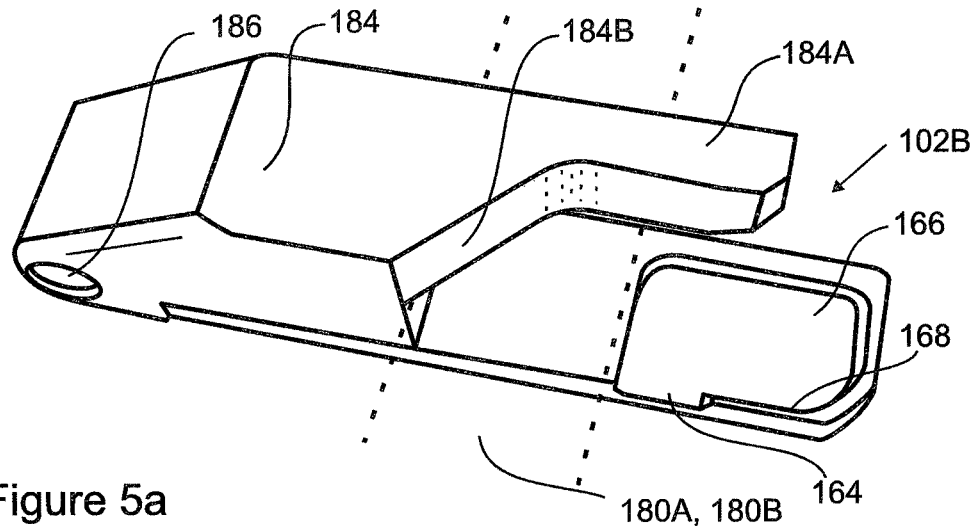
FIGS. 5a and 5b are simplified block diagrams illustrating in a top perspective view and a side view a modified locking key for use with the clamshell-type containing structure of the fishing trap release system according to the preferred embodiment of the invention.
Figure 5B:
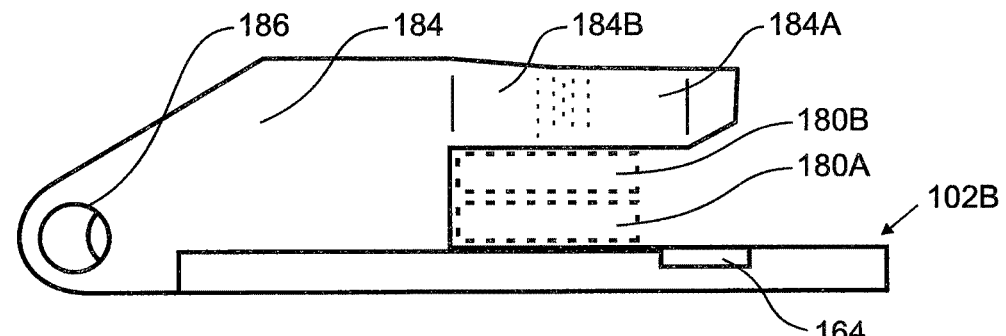

Referring to FIGS. 5a to 5e a modification of the locking key 102B for use with the clamshell-type containing structure 116 of the fishing trap retrieval system 100 is provided. The modification of the locking key 102B comprises a retaining extension 184 mounted to the locking key 102B which is adapted to mechanically retain the overlapped jaws 180A and 180B between a retaining portion 184A, 184B thereof and the locking key 102B, as illustrated in FIGS. 5a, and 5b. The retaining portion 184A, 184B comprises tapered section 184A and narrow section 184B to facilitate insertion of the locking element 138 of the locking device 102A with the locking element 138 being in the retracted position followed by pulling and turning the locking device 102A until the holding section 166 with rim 168 is secured to the locking element 138, as described hereinabove with reference to FIGS. 3c and 3d.

Figure 5C:
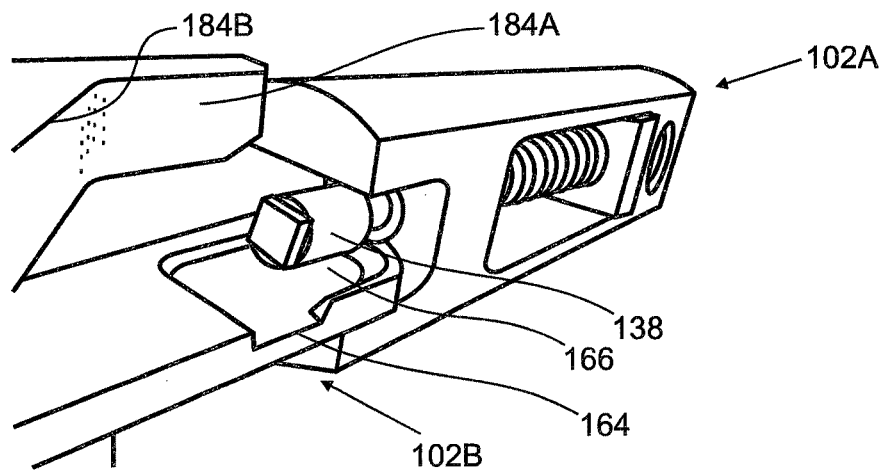
FIGS. 5c to 5e are simplified block diagrams illustrating in a side perspective view, a side view, and a top view the modified locking key engaged with the locking device of the fishing trap release system according to the preferred embodiment of the invention.
Figure 5D:
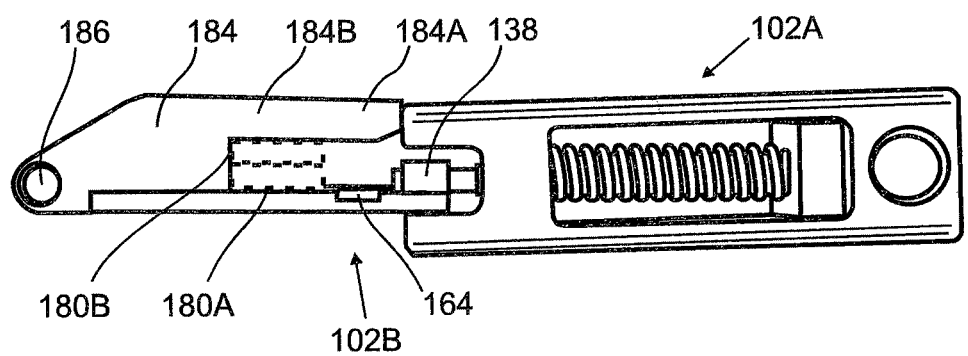
Figure 5E:
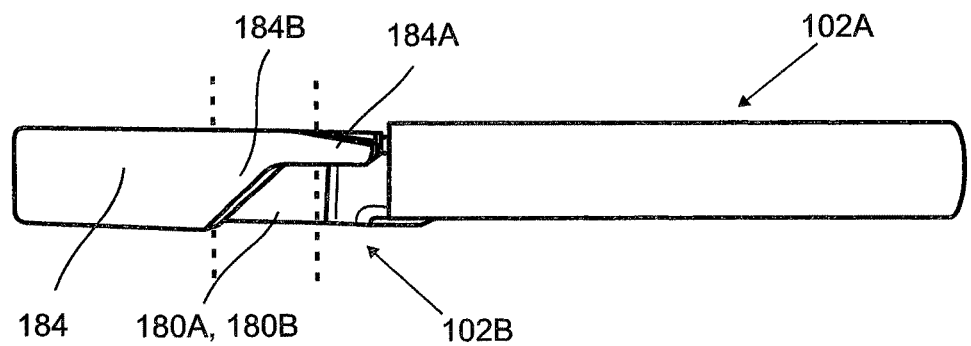

When the holding section 166 of the locking key 102B is secured to the locking element 138 of the locking device 102A, as illustrated in FIG. 5c, the overlapped jaws 180A and 180B are securely retained by the retaining extension 184, the locking key 102B and the locking device 102A, as illustrated in FIGS. 5d and 5e.

When the load acting on the release device 102A exceeds the predetermined load threshold the locking key 102B is released. With the locking key 102B being connected via bore 186 to the strong rope 14 section connected to the trap 12 and the bag 116, having end 116A connected to the strong rope 14 section connected to the strong rope buoy 16, the bag 116 with the jaws 180A and 180B is pulled away from the modified locking key 102B, thus releasing the jaws 180A and 180B and enabling the same to open.

In an example implementation, the modified locking key 102B is made of 316 stainless steel in a conventional manner, the retaining extension 184 is made of Acetal plastic material in a conventional manner and mounted to the locking key 102B using screw fasteners.

It is noted that the modified locking key 102B can also be used for the other rope containment implementations described hereinabove.

Figure 6A:
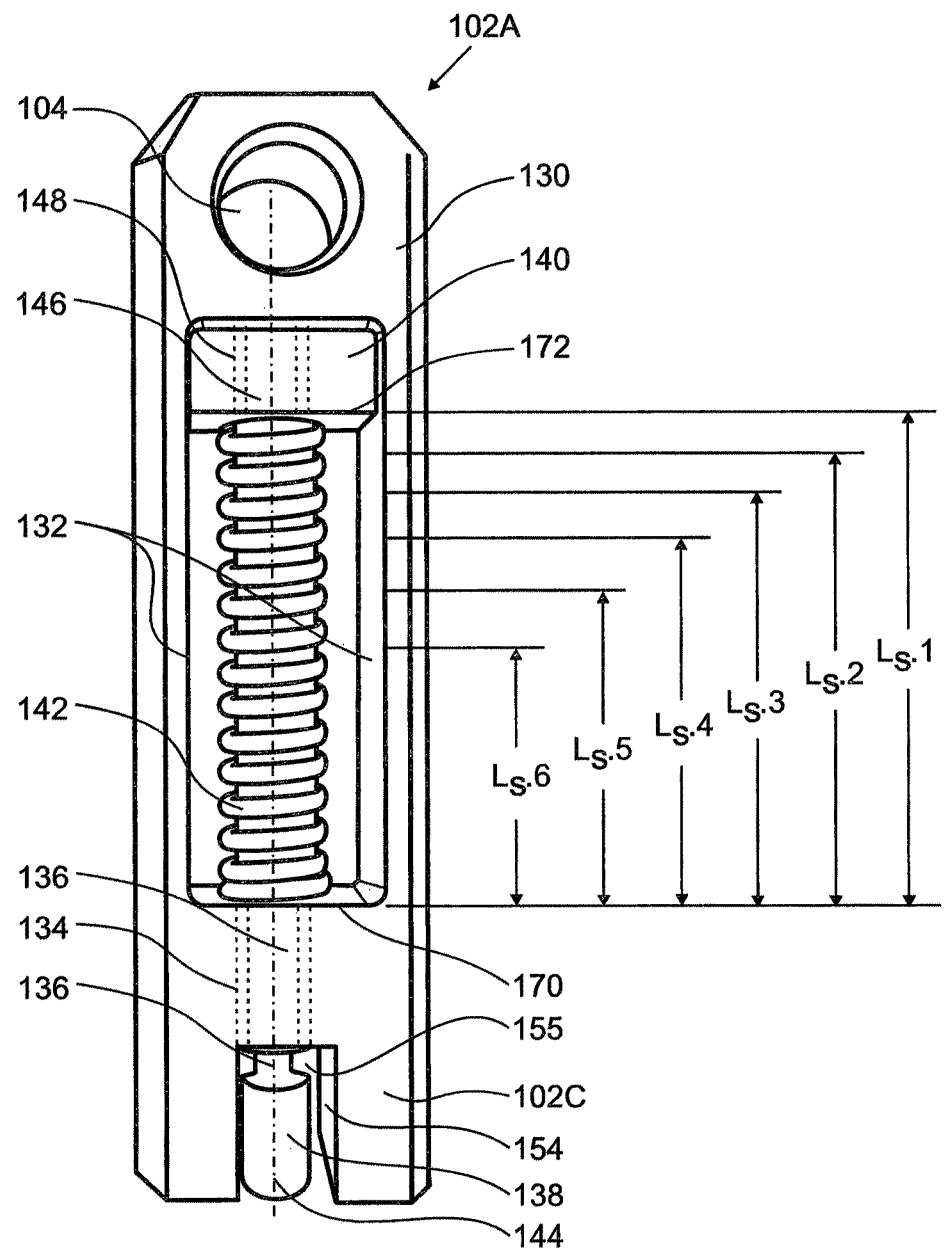
FIG. 6a is a simplified block diagram illustrating in a side view a modified locking device for enabling load threshold adjustment of the fishing trap release system according to the preferred embodiment of the invention; and, FIGS. 6b and 6c are simplified block diagrams illustrating in top view and a side view load gauge for use with the modified locking device for enabling load threshold adjustment of the fishing trap release system according to the preferred embodiment of the invention.
Figure 6B:
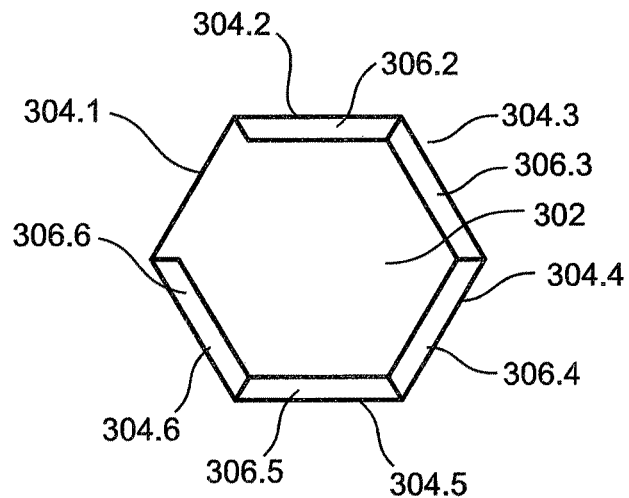
Figure 6C:
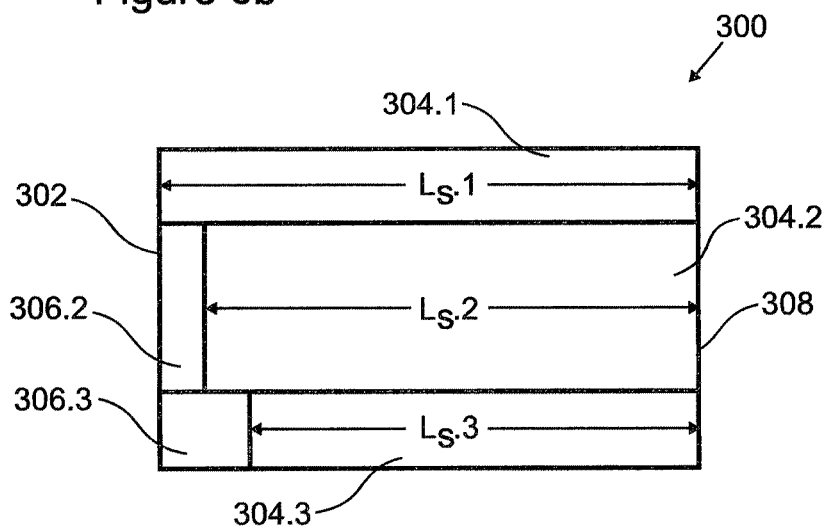

Referring to FIGS. 6a to 6c a modified locking device 102A of the fishing trap retrieval system 100 is provided. Compared to the locking device 102A described hereinabove, the threaded bore 148 disposed in the abutting element 140 is extended through the abutting element 140, enabling the threaded end portion 146 of the locking pin 136 to extend through the abutting element 140 and beyond, while threaded end portion 146 of the locking pin 136 is extended towards the locking element 138. This modification enables simple adjustment of the length of the helical compression spring 142 by simply turning the locking pin 136 via engaging element 152. The length of the helical compression spring 142 may be adjusted to one of the six lengths $L_S.1$ to $L_S.6$, as illustrated in FIG. 6a. Each length $L_S.1$ to $L_S.6$ corresponds to a respective predetermined load threshold 1 to 6.

In order to facilitate adjustment of the modified locking device 102A to a predetermined load threshold, Go-NoGo load gauge 300, as illustrated in FIGS. 6b and 6c, is provided. The load gauge 300 is provided for a compression spring 142 having a specific strength. The load gauge 300 comprises, for example, a hexagonal elongated body having top surface 302, six side surfaces 304.1 to 304.6. Side surface 304.1 extends from the top surface 302 to the bottom surface 308 and has length $L_S.1$. The side surfaces 304.2 to 304.6 are recessed 306.2 to 306.6 such that the length of each side surface 304.2 to 304.6 extending from the bottom surface corresponds to a length $L_S.2$ to $L_S.6$. Therefore, each side surface 304.1 to 304.6 is associated with a respective predetermined load threshold.

The modified locking device 102A is then adjusted to a predetermined load threshold as follows:
- insert the portion of the load gauge 300 with the side surface corresponding to the predetermined load threshold into the space between surface 170 of the housing 130 and surface 172 of the abutting element 140;
- turn the locking pin 136 via engaging element 152 until the bottom surface 308 and the recess 306.X of the side surface (or the top surface 302 if the largest predetermined load threshold has been selected) are in contact with the surface 170 of the housing 130 and the surface 172 of the abutting element 140; and,
- remove the load gauge 300.

In an example implementation a 300 lbs linear compression spring 142 is compressed by adjusting its length to one of six lengths $L_S.1$ to $L_S.6$ resulting in corresponding six different predetermined load thresholds 1 to 6 varying between 150 lbs and 400 lbs in 50 lbs increments.

The fishing trap retrieval system 100 enables use of weak ropes 112 for protecting larger aquatic animals that are capable of breaking the same when entangled therein, while also substantially reducing the risk of losing the fishing trap 12. For example, the fishing trap retrieval system 100 is easily adapted to enable use of weak rope 112 having a tensile strength of 1700 lbs in compliance with limitations put in place by NOAA/DFO for protecting Northern Atlantic right whales, but is not limited thereto, weak ropes 112 having less tensile strength may be employed. Loss of the fishing trap 12 is prevented by the deployment of the strong rope buoy 16 connected to the strong rope 14 which is currently in use such as, for example, strong ropes having a tensile strength between 10,000 lbs and 60,000 lbs.

The fishing trap retrieval system 100 is employable in in-shore and off-shore fishing for retrieving 'singles' (one surface buoy per trap), 'doubles' (two surface buoys, two traps with a ground line connecting the traps), and 'trawl fishing' (plurality of traps connected with ground line and two buoys). Furthermore, instead of connecting to the fishing trap 12, the fishing trap retrieval system 100 may be connected to an anchor or sled used in trawl fishing comprising a plurality of connected small, lightweight fishing traps.

In normal operation, the fishing trap retrieval system 100 is deployed and retrieved in a similar manner than the conventional system with the fishing trap 12 being connected via the strong rope 14 to the strong rope buoy 16 floating on the water surface 11 simply by having the surface buoy 114 floating on the water surface 11 and connected to the weak rope 112, while the strong rope buoy 16 is submerged. The fishing trap 12 is then retrieved simply by pulling the same up, together with the collapsed strong rope 14, the strong rope buoy 16, and the release mechanism 102 still in the first mode of operation, using the weak rope 112. Only in case the weak rope 112 is broken, for example, due to entanglement of a whale, or the load of the fishing trap is to heavy, the strong rope buoy 16 is released to enable retrieval of the fishing trap 12.

The fishing trap retrieval system 100 is easily implemented as a retrofit for retrofitting a conventional fishing trap retrieval system having fishing trap 12 connected via strong rope 14 to strong rope buoy 16 by connecting the load sensitive release mechanism 102 to the strong rope buoy 16, the fishing trap 12, and to a surface buoy 114 via a weak rope 112.

The present invention has been described herein with regard to preferred embodiments. However, it will be obvious to persons skilled in the art that a number of variations and modifications can be made without departing from the scope of the invention as described herein.

The embodiments of the invention in which an exclusive property or privilege is claimed are defined as follows:

1. A fishing trap retrieval system comprising:
   a strong rope adapted for being connected to a fishing trap at a first end thereof;
   a strong rope buoy connected to a second end of the strong rope;

means for maintaining a mid portion of the strong rope in a collapsed form;

a load sensitive release mechanism connected to the strong rope buoy and adapted for being connected to the fishing trap;

a surface buoy; and, a weak rope connected to the release mechanism at a first end thereof and to the surface buoy at a second end thereof;

wherein the release mechanism is adapted for transferring a buoyancy load exerted by the strong rope buoy when submerged to the fishing trap in a first mode of operation and for releasing the strong rope buoy when the load acting thereon exceeds a predetermined load threshold in a second mode of operation.

2. The system according to claim 1 wherein the predetermined load threshold for releasing the strong rope buoy is less than a tensile strength of the weak rope.

3. The system according to claim 2 wherein the release mechanism comprises a release device and a locking key and wherein the release device securely holds the locking key in the first mode of operation and releases the locking key in the second mode of operation.

4. The system according to claim 3 wherein the release device comprises a locking element adapted for interacting with the locking key in the first mode of operation with the locking element being movable between a first position for interacting with the locking key and a second position for releasing the locking key.

5. The system according to claim 4 wherein the release device is spring loaded such that the locking element is maintained in the first position until the predetermined load threshold is reached.

6. The system according to claim 5 wherein the release device comprises a compression spring.

7. The system according to claim 6 wherein the release device comprises a housing and a locking pin longitudinal movable mounted to the housing, the locking pin having the locking element at a first end thereof.

8. The system according to claim 7 wherein the release device comprises:

an abutting element mounted to a second end of the locking pin with the abutting element being longitudinal movable within the housing; and, a helical compression spring disposed between the housing and the abutting element with the compression spring surrounding a portion of the locking pin.

9. The system according to claim 8 wherein the predetermined load threshold is changed by exchanging the compression spring or by adjusting a length of the compression spring.

10. The system according to claim 5 wherein the locking key comprises an insertion section and a holding section with the insertion section being adapted to enable insertion of the locking element while the same is in the first position and the holding section being adapted to securely hold the locking key in the first mode of operation.

11. The system according to claim 4 wherein the release device is connected to the strong rope buoy and wherein the locking key is for being connected to the fishing trap.

12. The system according to claim 11 wherein the means for maintaining a mid portion of the strong rope in a collapsed form comprises a containing structure adapted for containing the mid portion of the strong rope in the collapsed form therein and for releasing the mid portion of the strong rope when the strong rope buoy is released.

13. The system according to claim 4 wherein the release device is connected to the strong rope buoy and wherein the locking key is connected to the release device via locking key rope.

14. The system according to claim 13 wherein the means for maintaining a mid portion of the strong rope in a collapsed form comprises the mid portion of the strong rope being coiled forming a strong rope coil and wherein the locking key rope forms a locking key rope loop around a section of the strong rope coil.

15. The system according to claim 14 comprising a connecting rope connected to the locking key rope loop and adapted for being connected to the fishing trap.

16. The system according to claim 15 comprising a ring element with a first section thereof being contained in the locking key rope loop and a second opposite section thereof being connected to the connecting rope.

17. The system according to claim 13 wherein the means for maintaining a mid portion of the strong rope in a collapsed form comprises the mid portion of the strong rope being contained in a bag having an opening, wherein a perimeter of the opening is surrounded by two jaws with the two jaws being pivotally movable with respect to each other between an open position and a closed position, and wherein the two jaws are connected to the bag in proximity to the opening.

18. A fishing trap retrieval system retrofit for retrofitting a fishing trap connected via a strong rope to a strong rope buoy comprising a load sensitive release mechanism adapted for being connected to the strong rope buoy, the fishing trap, and to a surface buoy via a weak rope, wherein the release mechanism is adapted for transferring a buoyancy load exerted by the strong rope buoy when submerged to the fishing trap in a first mode of operation and for releasing the strong rope buoy when the load acting thereon exceeds a predetermined load threshold in a second mode of operation with the predetermined load threshold being less than a tensile strength of the weak rope.

19. The retrofit according to claim 18 wherein the release mechanism comprises a release device and a locking key and wherein the release device securely holds the locking in the first mode of operation and releases the locking key in the second mode of operation and wherein the release device comprises a locking element adapted for interacting with the locking key in the first mode of operation with the locking element being movable between a first position for interacting with the locking key and a second position for releasing the locking key.

20. The retrofit according to claim 19 wherein the release device is spring loaded such that the locking element is maintained in the first position until the predetermined load threshold is reached and wherein the locking key comprises an insertion section and a holding section with the insertion section being adapted to enable insertion of the locking element while the same is in the first position and the holding section being adapted to securely hold the locking key in the first mode of operation.

21. The retrofit according to claim 20 wherein the release device comprises:

a housing;

a locking pin longitudinal movable mounted to the housing, the locking pin having the locking element at a first end thereof;

an abutting element mounted to a second end of the locking pin with the abutting element being longitudinal movable within the housing; and, a helical compression spring disposed between the housing and the abutting element with the compression spring surrounding a portion of the locking pin.

\* \* \* \* \*